US008095118B2

(12) United States Patent
Boctor (10) Patent No.: US 8,095,118 B2
(45) Date of Patent: Jan. 10, 2012

(54) ADDRESS BOOK REMOTE ACCESS AND EXTENSIBILITY

(75) Inventor: Victor Boctor, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 382 days.

(21) Appl. No.: 12/351,603

(22) Filed: Jan. 9, 2009

(65) Prior Publication Data

US 2010/0178902 A1 Jul. 15, 2010

(51) Int. Cl.
*H04L 29/06* (2006.01)
(52) U.S. Cl. .............. 455/414.3; 455/408; 455/419; 455/412.1; 455/414.2
(58) Field of Classification Search .......... 455/408, 455/419, 412.1, 414.3, 414.4
See application file for complete search history.

(56) References Cited

U.S. PATENT DOCUMENTS

| 6,189,026 B1 | 2/2001 | Birrell et al. | |
|---|---|---|---|
| 7,283,831 B2 | 10/2007 | Caldini et al. | |
| 7,433,923 B2 | 10/2008 | Adkins | |
| 7,440,746 B1* | 10/2008 | Swan | 455/412.1 |
| 2004/0234049 A1 | 11/2004 | Melideo | |
| 2005/0188027 A1 | 8/2005 | Clarke et al. | |
| 2006/0128363 A1* | 6/2006 | Cooling et al. | 455/412.1 |
| 2006/0234736 A1* | 10/2006 | Lazaro et al. | 455/466 |
| 2006/0246884 A1* | 11/2006 | Ansari | 455/419 |
| 2008/0013712 A1 | 1/2008 | Gopinath | |
| 2009/0187630 A1* | 7/2009 | Narayanaswami et al. | 709/206 |

FOREIGN PATENT DOCUMENTS

WO   2008131512 A1   11/2008

OTHER PUBLICATIONS

"Chapter 7: Address Books and Recipients", retrieved at <<http://msdn.microsoft.com/en-us/library/cc513843.aspx>>, Nov. 17, 2008, pp. 26.
"Viewstation Address Book Management", retrieved at <<http://video.ifas.ufl.edu/Directory/DirectoryViewstation.htm>>, Nov. 17, 2008, pp. 6.
"Chapter 2: Outlook as a Platform", retrieved at <<http://msdn.microsoft.com/en-us/library/cc513842.aspx>>, Nov. 17, 2008, pp. 27.

* cited by examiner

*Primary Examiner* — Kwasi Karikari
(74) *Attorney, Agent, or Firm* — Turk IP Law, LLC (57) ABSTRACT

Address book data available to a user such as contact information, group information, resource information, and similar data, are retrieved from a plurality of sources by a third party service. The retrieved data is customized for consistent presentation and provided to the user without the user's application having to communicate with individual data sources for retrieving the data.

18 Claims, 5 Drawing Sheets

ADDRESS BOOK REMOTE ACCESS AND EXTENSIBILITY

BACKGROUND

Modern communication systems have a large number of capabilities including integration of various communication modalities with different services. For example, instant messaging, voice/video communications, and other forms of communication may be combined with presence and availability information of subscribers. To provide a broad spectrum of services, a variety of communication applications store, manage, and disseminate different types of information. Conventional email applications, for example, stored and managed basic user information such as name, address, email address, phone number, and title. Modern systems integrate calendar information, presence information, alternate contacts, and other types of data for providing enhanced services. Moreover, communication applications such as email applications tend to have differing protocols, data schema, and other differences.

On the user side, a majority of users typically utilize multiple services such as email accounts. For example, a typical user may have a work email (and any other associated services), a personal email, an instant messaging service, and comparable services. Since some or all of those services may use different protocols, data schema, and data storage, combining the information from the different services is a challenging task.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to retrieving user associated data such as contact information, group information, resource information, and similar data from a plurality of sources, customizing the data for consistent presentation, and providing to the user without the user having to retrieve the data separately from each source.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, address book information from a plurality of local and/or remote sources may be provided to a user's client application in a consistent manner through a third party service. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk. The computer program product may also be a propagated signal on a carrier (e.g. a frequency or phase modulated signal) or medium readable by a computing system and encoding a computer program of instructions for executing a computer process.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "dynamic" as used in conjunction with address book information is intended to illustrate the distinction between conventional approaches, where statically stored and managed information is used with rigid rules, and embodiments, which enable creation and updating of address book information based on frequently changing parameters such as subscriber presence. Furthermore, the term address book is used to represent storage of data associated with providing communication services to a user. Contact information such as names and addresses of a user's contact, calendar information associated with the user (and/or with the contacts), information associated with resources available to the user (printers, scanners, etc.), and comparable data are examples of information that may be stored and provided to a user as part of address book data in an enhanced communication system.

Figure 1:
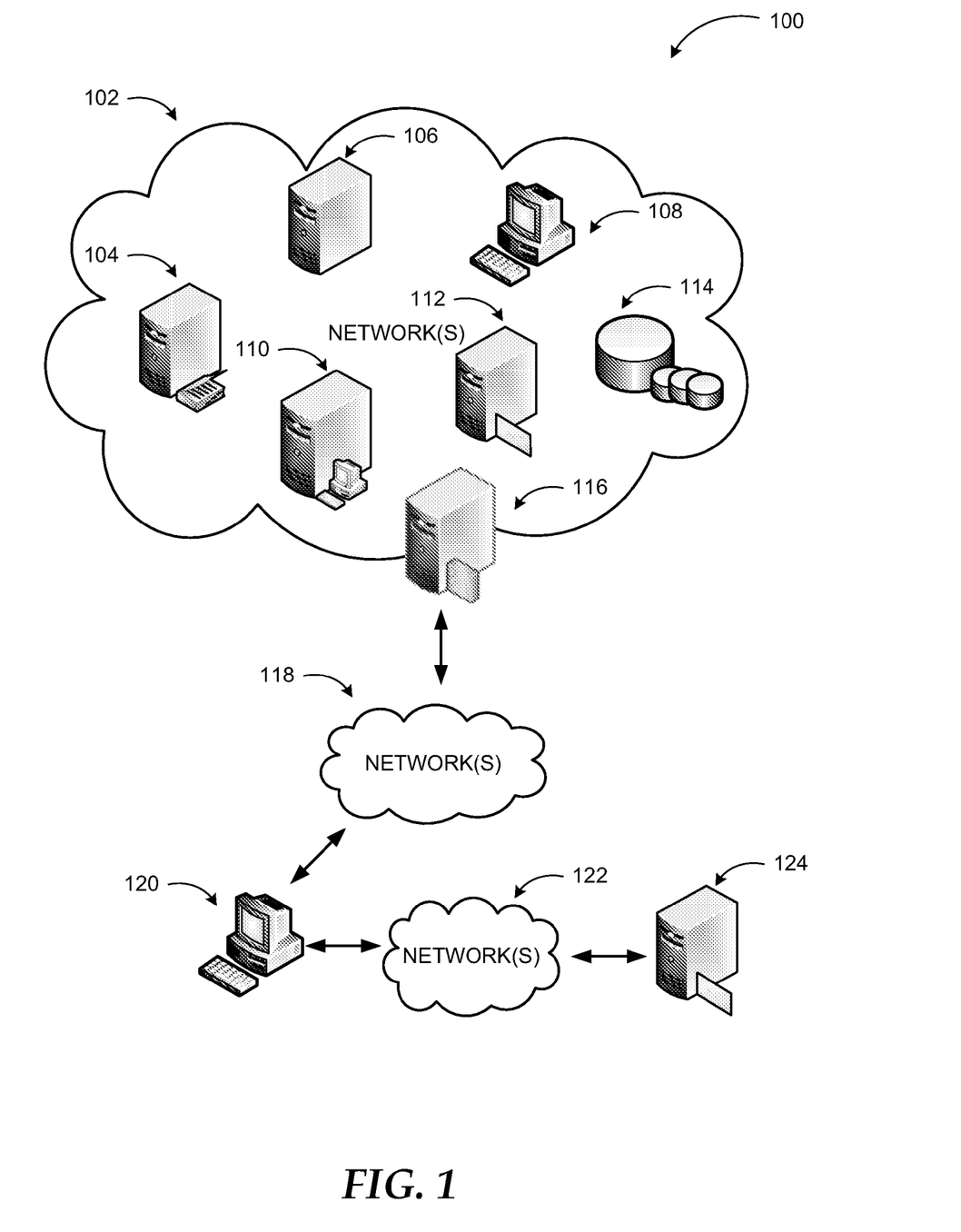
FIG. 1 is a diagram illustrating an example networked system, where address book information at multiple sources is accessed.

Referring to FIG. 1, diagram 100 illustrating an example networked system, where address book information at multiple sources is accessed, is illustrated. An enhanced communication system with a wide range of capabilities and services to be provided to subscribers may operate employing a number of servers, specialized computing devices (routers, firewalls, etc.). An example of enhanced communication services is a unified communication system, which is a real-time communications system facilitating instant messaging, presence, audio-video conferencing, and web conferencing functionality among other things.

In a unified communication system, users may communicate via a variety of end devices, which are client devices of the unified communication system. Each client device (e.g. 108) may be capable of executing one or more communication applications for voice communication, video communication, instant messaging, application sharing, data sharing, white-boarding, and comparable ones. In addition to their advanced functionality, the end devices may also facilitate traditional phone calls through an external connection such as through a Public Switched Telephone Network ("PSTN"). End devices may include any type of smart phone, cellular phone, any computing device executing a communication application, a smart automobile console, and advanced phone devices with additional functionality.

An enhanced communication may include a number of servers for performing different tasks. For example, servers may provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, the servers may provide access to these additional communication modes (e.g. instant messaging, video communication, etc.) through an access server. An access server may reside in a perimeter network and enable connectivity through the unified communication network(s) with other users in one of the additional communication modes. Some of the servers (e.g. 106) may perform combinations of the above described functionalities or specialized servers that only provide a particular functionality. Home servers providing presence functionality, routing servers providing routing functionality, firewall servers providing security functionality (116) are examples of such servers.

In an enhanced communication system like a unified communication system, users may have one or more identities, which is not necessarily limited to a phone number. The identity may take any form depending on the integrated networks, such as a telephone number, a Session Initiation Protocol (SIP) Uniform Resource Identifier (URI), or any other identifier. Moreover, typical users, today, have multiple identities at different services for their communication needs. For example a user may have a work communication account for the listed communication services, one or more private email accounts with various providers, a social network account that enables instant messaging, email, or even video calls. Such a user may utilize the different communication services through one or more applications executed on client device 120. The applications may communicate with communication services through various networks such as an email service executed on server 124 through network(s) 122.

Network(s) 102 is an example infrastructure for an enhanced communication service. Network(s) 102 brings together directory server 104, administration server 110, email management server 112, and data stores 114 in addition to the above discussed servers. Users may interact with the communication service directly through client devices within network(s) 102 (e.g. 108) or remotely through another network (e.g. 118). Firewall server 116 may provide security services in case of remote connections. Directory server 104 may manage information associated with the communication services such as contact information (names, addresses, titles, organizational information). While information managed by the directory server 104 is typically static, a directory server with advanced capabilities may also manage presence information (availability, calendar information, location information), group information (delegates, teams, other groupings), and information associated with available resources such as printers, scanners, conference rooms, or other services. A portion or all of this information may also be managed by other servers (e.g. presence server, access server) and stored in data stores 114.

As discussed above, enhanced communication technologies enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, information in addition to the examples provided above may be used by the service in determining whether or not to initiate communication with a subscriber, which mode of communication, and similar decisions.

Network(s) 102, 118, and 122 may comprise any topology of servers, clients, Internet service providers, and communication media. A system according to embodiments may have a static or dynamic topology. Network(s) 102, 118, and 122 may include a secure network such as an enterprise network, an unsecure network such as a wireless open network, or the Internet. Network(s) 102, 118, and 122 may also include or coordinate communication over other networks such as PSTN or cellular networks. Network(s) 102, 118, and 122 provides communication between the nodes described herein. By way of example, and not limitation, network(s) 102, 118, and 122 may include wireless media such as acoustic, RF, infrared and other wireless media.

Many other configurations of computing devices, applications, data sources, and data distribution systems, and information types may be employed to implement a system for managing remote address book access and extensibility. Furthermore, the networked environments discussed in FIG. 1 are for illustration purposes only. Embodiments are not limited to the example applications, modules, or processes.

Figure 2:
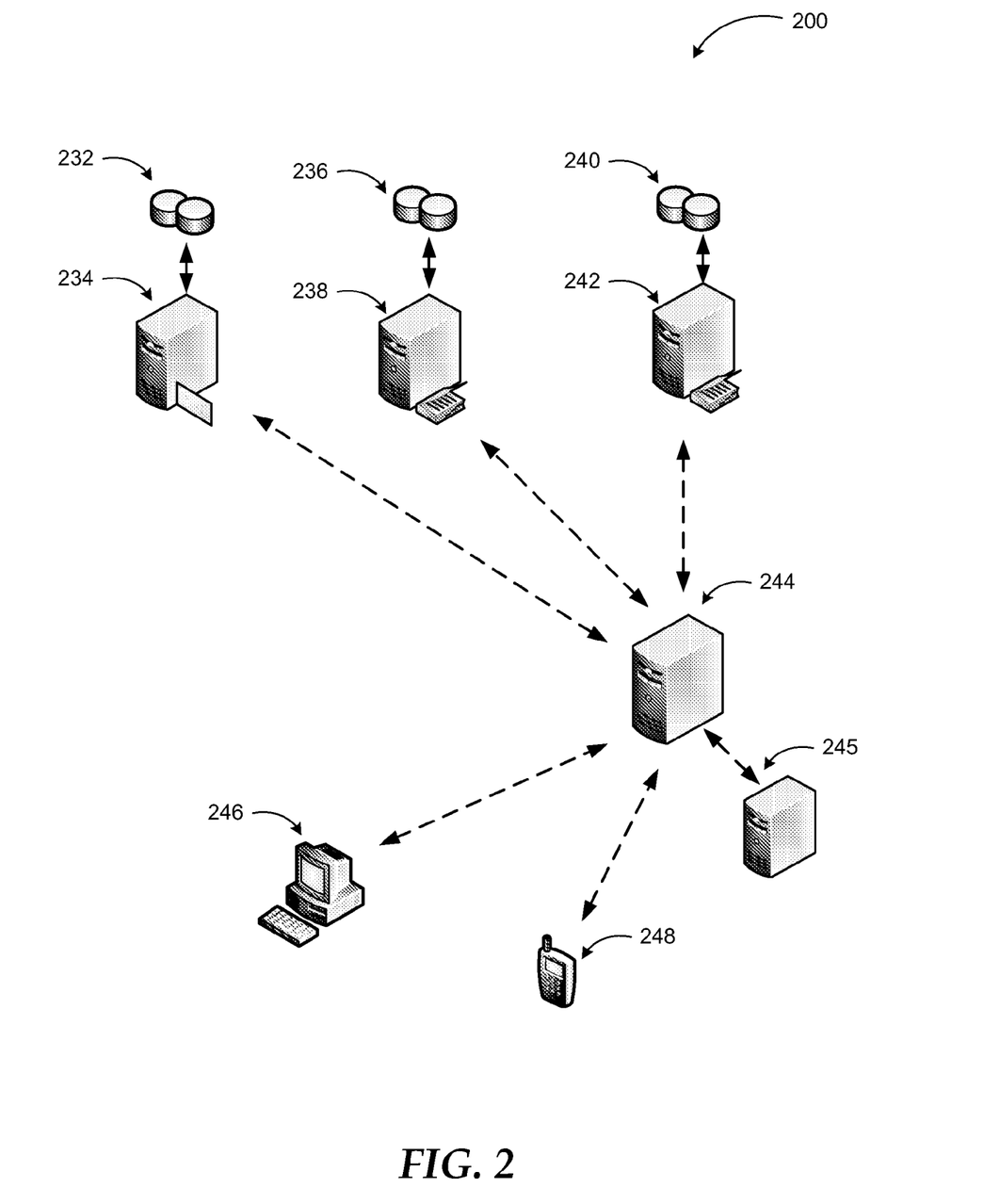
FIG. 2 illustrates another example system employing remote address book access according to some embodiments.

FIG. 2 illustrates another example system 200 employing remote address book access according to some embodiments. While a system according to embodiments is likely to include a number of servers and services such as those illustratively discussed in FIG. 1, only exemplary ones relevant to embodiments are shown in FIG. 2.

Each user in a remote organization may have access to a different subset of address list entries, and the synchronized address lists cannot be shared and may have to be mirrored per user, rendering the process resource intensive.

The different communication services a user may utilize are represented in diagram 200 by servers 234, 238, and 242 with their respective data stores 232, 236, 240, where the address book information may be stored. The user may access any one of these services remotely through an application on client device 246 or 248. In a system according to embodiments, a third party service executed on server 244 may receive a request from one of the client devices, access one or more of the communication services, retrieve the data using the user's credentials, customize the data for consistent presentation, and provide to the user's client device. Since authentication is a crucial aspect of most communication systems, an independent authentication service (245) may be utilized to authenticate the third party service as representing the user to the services.

Customization and presentation of the data may depend on the application employed by the user. Discrepancies between the formats and/or schema of the data from different services and supported features may be handled according to default policies, user preferences, or a combination of the two.

Figure 3:
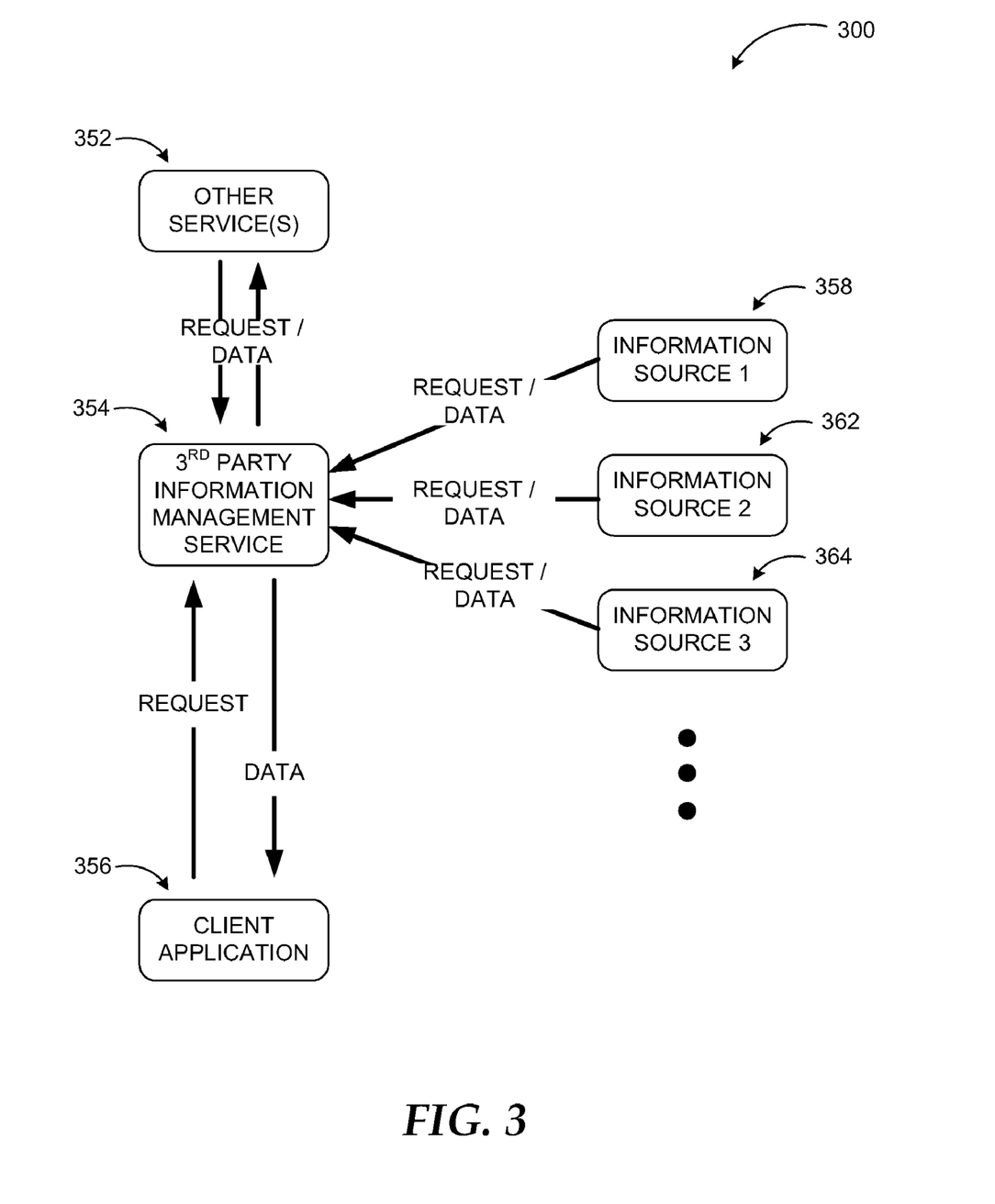
FIG. 3 is a conceptual diagram illustrating main components and their interaction in a system for remotely accessing and providing address book data to a user according to embodiments.

FIG. 3 is a conceptual diagram 300 illustrating main components and their interaction in a system for remotely accessing and providing address book data to a user according to embodiments. Third party information management service 354 handles retrieval of data from information sources 1-3 (358, 362, and 364), customization for consistency, and transmittal to client application 356 for subsequent presentation. The data may be self-contained data from a single source (e.g. contact address, email address, phone number from a directory service) or dynamic data from multiple sources (e.g. contact information with presence, where a presence server provides some of the information and another server provides calendar information for availability). In another example scenario, a directory server may provide basic information for available conference rooms and a presence server may provide up-to-date availability information, both of which may be utilized by the third party information management service to combine and present conference room data to the user.

According to some embodiments, a single protocol may be employed between the client application 356 and third party information management service 354 regardless of the data source. Third party information management service 354 may employ applicable protocols when retrieving data from information sources 1-3 (358, 362, and 364).

Third party information management service 354 may translate data from individual information sources and modify the schema for consistency. As discussed previously, features supported by the information source may vary. The data provided to client application 356 may be customized to manage these differences. For example, some features may be hidden for consistent presentation of the data. According to other embodiments, default features may be used as a back-up for features not supported by a particular information source (or data). The discrepancies between data schema and supported features may be handled based on a set of default policies, a set of user preferences, client application capabilities, client device capabilities, network capabilities, or a combination of any of those.

According to further embodiments, third party information management service 354 may render the customized data available through a standard Application Programming Interface (API) to other services 352 for their use on behalf of the user. Similarly, third party information management service 354 may accept information from other services 352 for use in processing user data. For example, third party information management service 354 may support a number of standard protocols for interfacing with major communication services and expose an API for other communication services that do not conform to the standard protocols. This way, user's data from a service with a custom protocol may still be retrieved as long as that service can provide the data using the third party information management service's API.

Other services 352 may also represent auxiliary information sources, whose data may be combined with data from one of the information sources 1-3 to complement a particular feature. For example, other services 352 may provide Global Positioning System (GPS) data for particular contacts, whose main contact information may be received from information source 1 (358) and combined with the GPS data from other services 352 as part of that contact's presence information.

Third party information management service 354 may provide the processed data to client application 356 as a contact card. Contact card is an increasingly standardized form of providing address book information about contacts, groups, and resources and may include any of the information given as examples herein.

The above discussed scenarios, example systems, communications methods, or applications are for illustration purposes. Embodiments are not restricted to those examples. Other forms of user data, contact cards, and applications may be used in implementing remote address book access and extensibility in a similar manner using the principles described herein.

Figure 4:
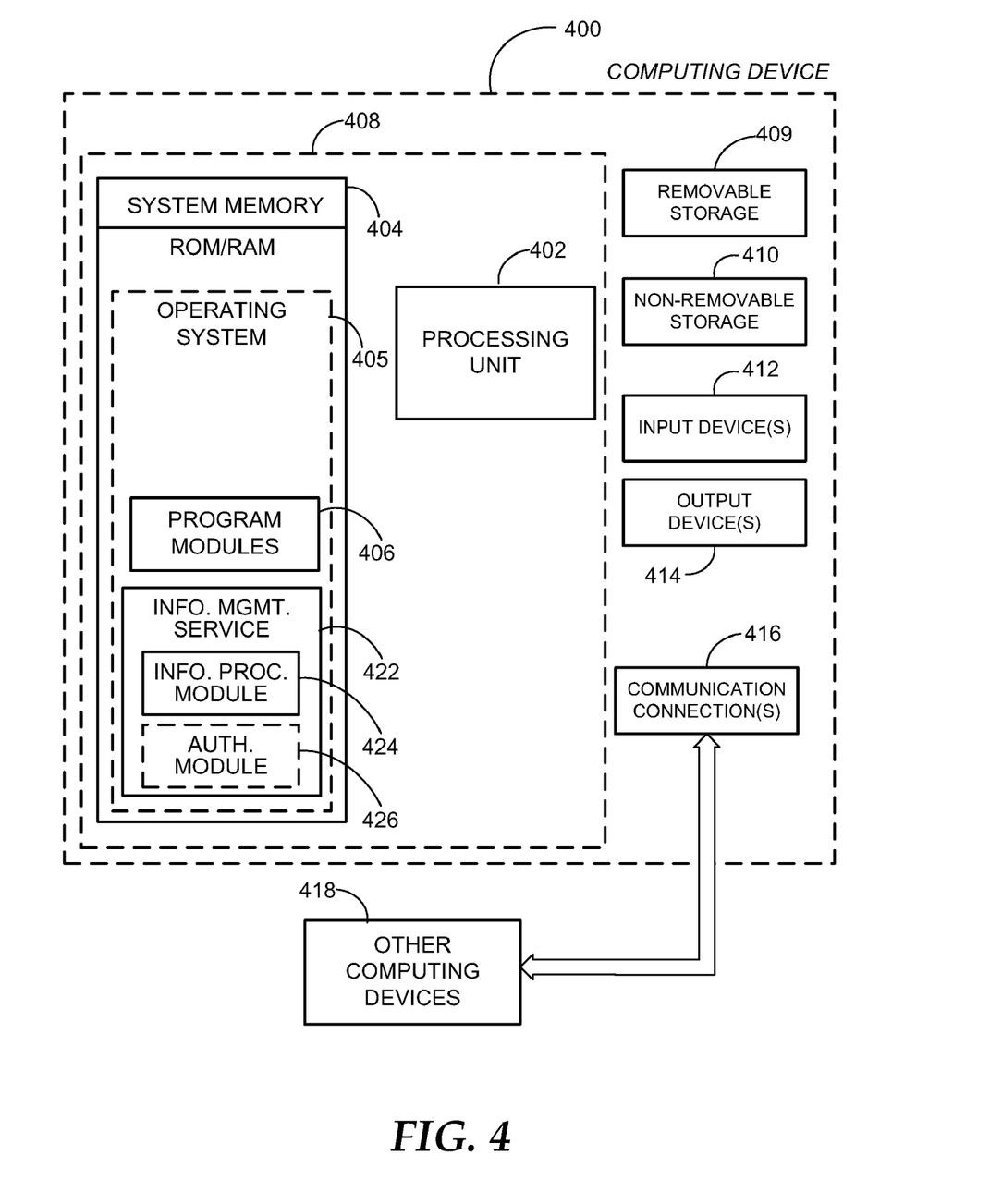
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment for an application according to embodiments is illustrated, such as computing device 400. In a basic configuration, computing device 400 may be a communication server or another server for managing remote access to address book information for users and include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of the platform, such as the WINDOWS® operating systems from MICROSOFT CORPORATION of Redmond, Wash. The system memory 404 may also include one or more software applications such as program modules 406, information management service 422, information processing module 424, and optional authentication module 426.

Information management service 422 may facilitate retrieval of address book data (static and dynamic) from multiple information sources employing applicable protocols and delivery of customized information to client applications for consistent presentation of the address book data. Information processing module 424 may perform the customization operations discussed above such as translation and/or filtering of received data, modification of data schema, handling of discrepant features, resolution of overlapping or discrepant data (e.g. contact information for the same contact from two sources that may or may not be the same). As mentioned, many communication services require some form of authentication, which may also be different depending on the service. Optional authentication module 426 may manage authentication of the user's credentials to respective information sources (communication services), preferably without the user having to provide their credentials each repeatedly. Information management service 422, information processing module 424, and optional authentication module 426 may be separate applications or integral modules of a hosted service that provides enhanced communication services to client applications/devices. This basic configuration is illustrated in FIG. 4 by those components within dashed line 408.

Computing device 400 may have additional features or functionality. For example, the computing device 400 may also include additional data storage devices (removable and/or non-removable) such as, for example, magnetic disks, optical disks, or tape. Such additional storage is illustrated in FIG. 4 by removable storage 409 and non-removable storage 410. Computer readable storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, which can be used to store the desired information and which can be accessed by computing device 400. Any such computer readable storage media may be part of computing device 400. Computing device 400 may also have input device(s) 412 such as keyboard, mouse, pen, voice input device, touch input device, and comparable input devices. Output device(s) 414 such as a display, speakers, printer, and other types of output devices may also be included. These devices are well known in the art and need not be discussed at length here.

Computing device 400 may also contain communication connections 416 that allow the device to communicate with other devices 418, such as over a wireless network in a distributed computing environment, a satellite link, a cellular link, and comparable mechanisms. Other devices 418 may include computer device(s) that execute communication applications, other directory or presence servers, and comparable devices. Communication connection(s) 416 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
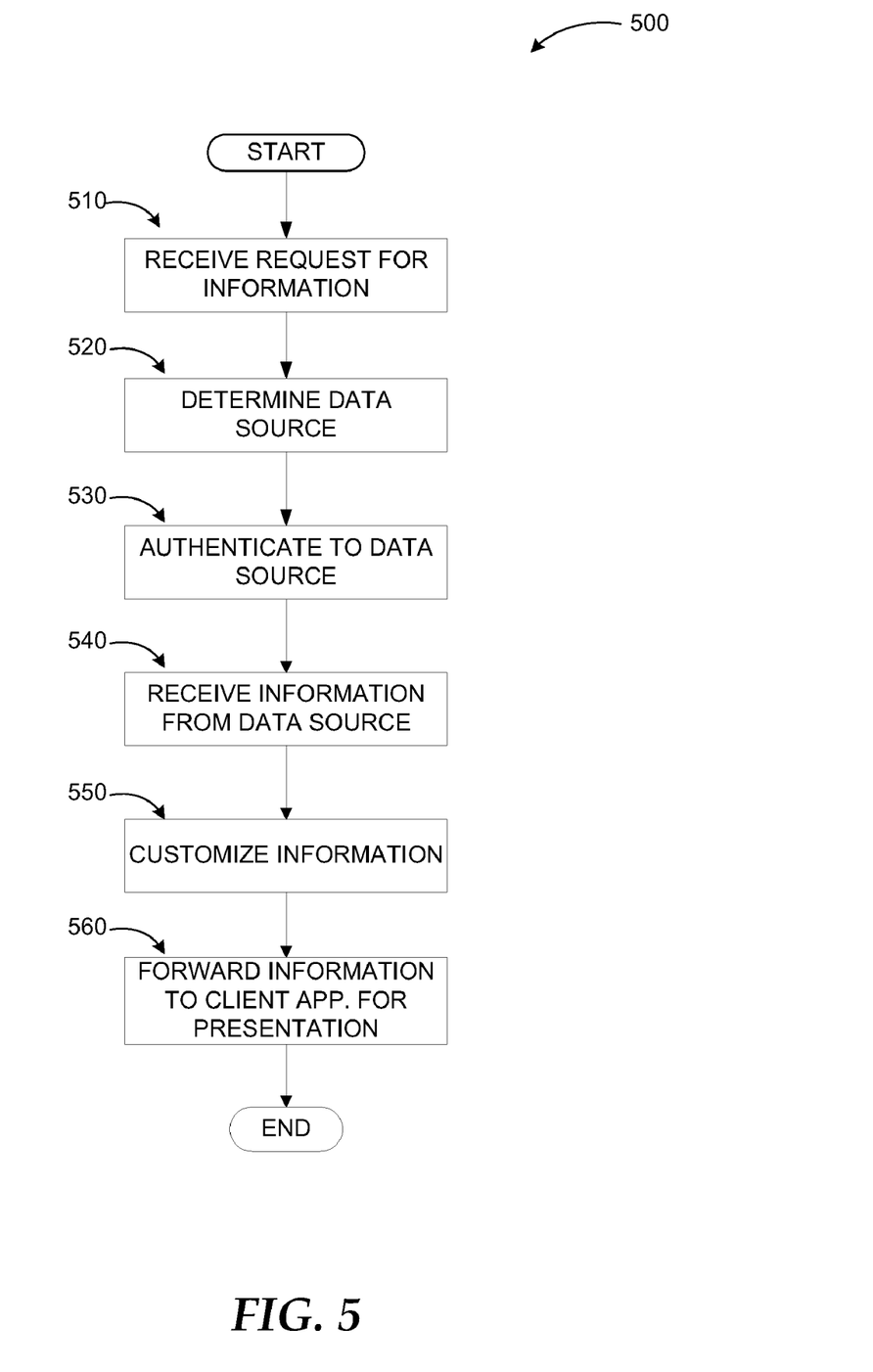
FIG. 5 illustrates a logic flow diagram for providing address book information from multiple sources to a user according to embodiments.

FIG. 5 illustrates a logic flow diagram 500 for providing address book information from multiple sources to a user according to embodiments. Process 500 may be implemented as part of an enhanced communication system that includes exchange of address book information with subscribers.

Process 500 begins with operation 510, where a request for information is received from a client application. A client application may request all details or a subset of the available details about a contact. Based on what is requested, a different subset of data sources may be contacted. For example, only the presence server may be contacted if the user requested the presence information. Alternatively, remote address book access may be provided periodically without necessarily awaiting client application request. At operation 520, a data source associated with the requested (or configured to update) data is determined. As discussed previously, the data sources may include a variety of servers associated with communication services, where the user may have an account and access rights associated with that account. According to some embodiments, a protocol employed to retrieve information from a data source may be auto-detected, where the auto-detection is performed once and persisted for future use.

At optional operation 530, the user's credentials may be authenticated to the data source. This may be done through a variety of ways, some of which may involve a third party authentication service. Subsequently, the information may be requested and received from the data source at operation 540. At operation 550, the information is customized through translation, filtering, and other operations for consistent presentation of the information from a variety of sources to the user. At operation 560, the customized data is forwarded to the user's client application for presentation to the user.

The operations included in process 500 are for illustration purposes. Providing remote address book information access through a third party service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing remote access to contact information, the method comprising:
   receiving a request for contact information from a client application associated with a user;
   determining a data source among a plurality of data sources associated with the requested contact information, each data source supporting a distinct set of features;
   requesting the contact information from the data source;
   receiving the contact information from the data source;
   customizing the contact information for consistent presentation of contact information from the plurality of data sources;
   performing one of: hiding unsupported features and replacing unsupported features with a default feature for the consistent presentation of the contact information; and
   forwarding the customized contact information to the client application.

2. The method of claim 1, further comprising:
auto-detecting a protocol employed to retrieve information from a data source, wherein the auto-detection is performed once and persisted for repeated use.

3. The method of claim 1, further comprising:
authenticating the user to the data source in a transparent manner to the user;
communicating with the client application employing a first protocol; and
communicating with the data source employing a second protocol.

4. The method of claim 1, wherein the contact information includes at least one from a set of: personal contact information comprising delegate information and organization charts; group contact information; presence information for contacts; and resource information for resources.

5. The method of claim 4, wherein the group contact information includes at least one from a set of: owner information and group memberships, and wherein the resource information includes presence information associated with available resources including at least one from a set of: printers, scanners, display devices, recording devices, and conference rooms.

6. The method of claim 1, wherein a portion of the contact information is static and another portion of the contact information is dynamic each portion being managed by a separate data source.

7. The method of claim 1, wherein customizing the contact information includes at least one from a set of: translating the data, reformatting the data, filtering the data, and modifying a schema of the data.

8. The method of claim 1, wherein the contact information is forwarded to the client application in form of a contact card.

9. The method of claim 1, further comprising:
receiving additional data associated with the contact information from an auxiliary data source, wherein customizing the contact information further includes combining the additional data with the received contact information.

10. The method of claim 1, wherein a presentation format of the contact information determined based on at least one from a set of: a user preference, a data source format, a capability of the client application, a capability of a communication network, and a capability of a client device executing the client application.

11. A communication system for managing remote access to contact information, the system comprising:
an information management server configured to:
communicate with a plurality of data sources employing a plurality of protocols with respective data sources for receiving contact information associated with a user;
upon receiving overlapping contact information from at least two data sources, combine the overlapping contact information resolving conflicting portions of the contact information;
upon receiving and combining the contact information, customize the contact information for consistent presentation to the client employing at least one from a set of:
translating the contact information,
reformatting the contact information,
filtering the contact information,
modifying a schema of the contact information, and
combining the contact information with additional data received from an auxiliary data source; and
communicate with a client application to forward the customized contact information employing a single protocol regardless of a data source providing the contact information.

12. The system of claim 1, wherein the information management server is further configured to:
expose a standardized Application Programming Interface (API) such that any data source employing the standardized API is enabled to one of: provide contact information associated with the user and receive the customized contact information from the information management server.

13. The system of claim 11, wherein the contact information is received from at least two of: a first data source, a second data source, and the auxiliary data source, and wherein the contact information is customized based on at least one from a set of: default rules, user preferences, and data source rules.

14. The system of claim 11, wherein the client application is configured to facilitate at least one from a set of: a voice communication, a video communication, an instant messaging session, application sharing, data sharing, white-boarding, and an electronic mail exchange, and wherein the client application is executed on one of: a smart phone, a cellular phone, a smart automobile console, a desktop computer, a laptop computer, and a handheld computer.

15. A computer-readable storage memory device with instructions stored thereon for managing remote access to contact information, the instructions comprising:
in response to one of: receiving a request from a client application and expiration of a user-defined time period, determining at least one data source associated with a subscriber using the client application;
requesting contact information associated with the subscriber from the at least one data source;
receiving the contact information from the at least one data source, wherein the at least one data source is among a plurality of data sources each data source supporting a distinct set of features;
customizing the contact information for consistent presentation to the subscriber by adjusting at least one from a set of: data schema, data format, and supported features associated with the contact information based on a set of default rules and a set of user preferences;
performing one of: hiding unsupported features and replacing unsupported features with a default feature for the consistent presentation of the contact information;
if portions of the contact information are received from a plurality of data sources, consolidating the portions of the contact information based on the set of default rules and the set of user preferences; and
forwarding the customized contact information to the client application.

16. The computer-readable storage memory device of claim 15, wherein contact information received from a plurality of data sources are customized for consistent presentation in one of: a user defined manner, a third party information management service defined manner, and a manner defined by one of the plurality of data sources.

17. The computer-readable storage memory device of claim 15, wherein contact information is received from each data source employing each data source's respective protocol, while a single protocol is employed to forward the customized contact information to the client application.

18. The computer-readable storage memory device of claim 15, wherein the customized contact information includes static and dynamic information, and wherein a presence channel is used to update presence information associated with the customized contact information.

* * * * *